United States Patent [19]

Kaya et al.

[11] Patent Number: 4,833,107

[45] Date of Patent: May 23, 1989

[54] METHOD FOR PRODUCING NITRIDE-BASE CERAMICS

[75] Inventors: Hiroshi Kaya, Niiza; Kozaburo Tamura, Kodaira; Takeshi Isoda, Niiza, all of Japan

[73] Assignee: Toa Nenryo Kogyo Kabushiki Kaisha, Tokyo, Japan

[21] Appl. No.: 253,916

[22] Filed: Oct. 4, 1988

Related U.S. Application Data

[63] Continuation of Ser. No. 48,054, May 11, 1987, abandoned.

[30] Foreign Application Priority Data

Jun. 13, 1986 [JP] Japan .................. 61-136242

[51] Int. Cl.$^4$ .................................... C04B 35/58
[52] U.S. Cl. ............................ 501/97; 501/96; 501/98; 525/474; 264/65
[58] Field of Search .................. 501/96, 97, 98; 525/474; 264/65

[56] References Cited

U.S. PATENT DOCUMENTS

| | | | |
|---|---|---|---|
| 3,853,567 | 12/1974 | Verbeek | 501/90 |
| 4,097,294 | 6/1978 | Rice et al. | 501/88 |
| 4,535,007 | 8/1985 | Cannady | 525/474 |
| 4,650,773 | 3/1987 | Okamura et al. | 501/97 |
| 4,656,300 | 4/1987 | Lebrun et al. | 528/38 |
| 4,743,662 | 5/1988 | Lipowitz | 525/474 |

FOREIGN PATENT DOCUMENTS

| | | | |
|---|---|---|---|
| 0146802 | 7/1985 | European Pat. Off. | 501/97 |
| 2243527 | 9/1972 | Fed. Rep. of Germany . | |
| 49-69717 | of 1974 | Japan . | |
| 60-226890 | of 1985 | Japan . | |
| 61-151005 | 7/1986 | Japan | 501/97 |

OTHER PUBLICATIONS

U.S. patent application Ser. No. 572,209 Seyferth et al., 1984.

*Primary Examiner*—William R. Dixon, Jr.
*Assistant Examiner*—Anthony J. Green
*Attorney, Agent, or Firm*—Michael N. Meller

[57] ABSTRACT

Fired nitride-base ceramics, i.e., silicon nitride or oxynitride, having a low carbon content and, therefore, low electrical and thermal conductivities, can be produced by heat treating a ceramic precursor comprising polysilazane, polysiloxazane or polycarbosilazane or a mixture thereof as the main ingredient in a reducing atmosphere such as hydrogen, ammonia or a gas containing these components, followed by firing.

4 Claims, No Drawings

METHOD FOR PRODUCING NITRIDE-BASE CERAMICS

This application is a continuation, of application Ser. No. 048,054, filed 5/11/87 abandoned.

BACKGROUND OF THE INVENTION

1. Field of the Invention

The present invention relates to a method for producing a nitride-base ceramics, more specifically, a silicon nitride or oxynitride. The present invention particularly concerns heat treatment of a preceramic polymer mainly composed of polysilazane, polysiloxazane or polycarbosilazane, a precursor of the silicon nitride or oxynitride, to reduce their carbon content.

2. Description of the Related Art

Silicon nitride and silicon oxynitride have been attracting attention in various industrial fields due to their excellent properties, including mechanical strength, thermal shock resistance and electrical insulation. For making the shaped body with a high mechanical strength, compacted powders are sintered at near 2000° C. generally, because of their poor shaping properties. To avoid this shaping difficulty, attempts have been made to shape a preceramic polymer or a precursor for silicon nitride or oxynitride and then pyrolyze it to obtain a silicon nitride or oxynitride retaining the original shape. Examples of such attempts are disclosed in the following publications:

Japanese Unexamined Patent Publication (Kokai) No. 49-20206 (Wolfgang Verbeek)

A shape made of a uniform mixture of silicon carbide and silicon nitride is produced by thermally decomposing a silazane at a temperature of about 200° to 800° C. to form a fusible carbosilazane resin. The carbosilazane resin is shaped into a required form, which is then heated at a temperature of about 800° to 2000° C. in an inert atmosphere.

Japanese Unexamined Patent Publication (Kokai) No. 49-69717 (Gerdhart Winter)

A shape comprised of a uniform mixture of silicon carbide and silicon nitride is produced by reacting at least one of halogenosilanes and ammonia to form a silazane. A composition comprising the silazane is shaped and then heated at a temperatur of about 800° to 2000° C. in an inert atmosphere, thereby decomposing the silazane to silicon carbide and silicon nitride.

J. Applied Polymer Sci., Vol. 27, 3751–3761 (1982) (B. G. Penn et al.)

A silicon carbon-silicon nitride ($Si_xN_yC_z$) fiber is produced by thermally polymerizing tris(N-methylamine)methylsilane to obtain a polycarbosilazane resin and melt spinning the resin in an inert atmosphere. The resultant polycarbosilazane fiber is treated at 100° C. in a wet atmosphere to make the fiber infusible, and then subjected to a heat treatment at 1500° C. in a nitrogen atmosphere.

Japanese Unexamined Patent Publication (Kokai) No. 60-226890 (D. Seyferth)

A ceramic comprising a mixture of silicon carbide and silicon nitride is produced by shaping a polysilazane having a repeating unit of

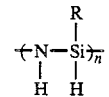

and comprising a plurality of precursor residues bonded to each other by an $Si_2N_2$ bridge containing

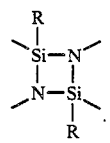

The shaped polysilazane is then heated at a temperature of up to 1420° C. under a nitrogen flow, and the polysilazane is then decomposed into silicon carbide and silicon nitride.

The ceramics produced by the above processes are the mixture of silicon carbide, silicon nitride and, in most cases, free carbon, thus resulting in reduced electrical and thermal insulation properties due to the silicon carbide and free carbon content. Further, the silicon carbide and free carbon have a higher reactivity with aluminum than silicon nitride and, therefore, a composite of aluminum with ceramics comprising silicon carbide and free carbon as a reinforcing member may be deteriorated.

SUMMARY OF THE INVENTION

During investigation into a novel method for producing a composition mainly composed of polysilazane, polysiloxazane or polycarbosilazane as a precursor for nitride-base ceramics, the inventors found that, by heat treating the above polymers in an atmosphere of hydrogen, ammonia or a gas containing these components, the carbon content of the polymers can be remarkably reduced and a nitride-base ceramic product produced from the above heat treated polymers has an extremely low carbon content, and as a result, accomplished the present invention.

Thus, the present invention resides in a method for producing a nitride-base ceramic, comprising the steps of: heat treating a ceramic precursor mainly composed of one selected from the group consisting of polysilazane, polysiloxazane, polycarbosilazane and a mixture thereof, in a reducing atmosphere to reduce the carbon content of the ceramic precursor; and then firing the ceramic precursor to produce one of silicon nitride and silicon oxynitride with a low carbon content.

DESCRIPTION OF THE PREFERRED EMBODIMENTS

When the above-mentioned precursor polymers containing carbon are heated, carbon radicals are produced by decomposition of the polymers. If the heat treatment is conducted in a reducing atmosphere, such as in hydrogen, ammonia or a gas containing these components, activated hydrogen is produced from the reducing gas and reacts with the carbon radicals to form volatile hydrocarbons, which are removed by volatilization, thus remarkably reducing the carbon content of the precursor polymer. The inventors traced the reaction involving removal of carbon-containing functionals by preparing potassium bromide pellet samples containing products obtained by heat treating the precursor polymer, and carrying out infrared absorption spectra analyses of the samples. For example, polymethylhydrosilazane has characteristic absorptions of $CH_3$, $CH_2$, and CH at 3000 to 2850 cm$^{-1}$ and a characteristic absorption of Si—$CH_3$ at 1260 cm$^{-1}$. These characteristic absorptions of the $CH_3$ group disappeared at 800° C. when a polymethylhydrosilazane was heated in a nitrogen atmosphere, and at 650° C. when heated in a hydrogen atmosphere. Further, the absorption intensities of the $CH_3$ group and the carbon content of the product by heat treatment were reduced in accordance with the heating time. From the above, the following is constructed: If the carbon-containing precursor polymers are heated, —Si—$CH_2$—bonds are cleaved to radicals such as —Si., .$CH_2$—, and .H, and radical recombination reactions occur while dehydrogen and demethane reactions also occur; and as a result, —Si—$CH_2$—Si— and —Si$CH_2$—$CH_2$Si— bonds are formed, and at a higher temperature, an inorganic structure comprising Si—C and C≡C bonds is formed. If the heat treatment is conducted in an atmosphere of hydrogen, ammonia, hydrazine or a gas containing these components, the dehydrogen reaction and the radical recombination reaction are suppressed and the demethane reaction is accelerated, and thus carbon is effectively removed from the polymers. As a result, the carbon content of the nitride-base ceramics is remarkably reduced.

The precursor is a polymer, mainly composed of polysilazane, polysiloxazane and/or polycarbosilazane. The polysilazane has the Si—N bond in the main skeleton, the polysiloxazane the Si—N and Si—O bonds in the main skeleton, and the polycarbosilazane and the Si—N and Si—C bonds in the main skeleton, and these polymers are a linear or cyclic polymer or a complex polymer thereof. A typical polysilazane of the precursor has a main repeating unit of $+(SiR_{2-x}H_xNR'_{1-y}H_y)+$ where $0 \leq x \leq 2$, $0 \leq y \leq 1$, and R and R' are a lower alkyl, alkoxy, vinyl or allyl group, having 1 to 6 carbon atoms. A typical polysiloxazane of the precursor has the main repeating units of $+(SiR_{2-x}H_xNR'_{1-y}H_y)+$ and $+(SiR_{2-x}H_xO)+$ where x, y, R and R' are the same as defined in the above formula. A typical polycarbosilazane of the precursor has the main repeating units of $+(SiR_{2-x}H_xNR'_{1-y}H_y)+$ where x, y, R and R' are the same as defined in the above formula and $+(SiCR''_{4-z}H_z)+$ where $0 \leq z \leq 4$ and R'' is the same as R defined in the above formula. The precursor polymer used in the present invention may comprise two or more of the Si—N, Si—O, and Si—C bonds in the polymer and the precursor polymer may be a mixture of the polymers mentioned above. Such precursor polymers generally have a carbon-containing group, such as alkyl, alkoxy, vinyl or allyl group having a relatively low number of carbon atoms, as a side chain. In the heat treatment under a reducing atmosphere, such carbon atoms in the side chain and the main skeleton of the polycarbosilazane are removed.

If necessary, the polymer of a ceramic precursor may be formed into a shape desired as a final product, prior to the heat treatment in a reducing atmosphere. Also, it may be in the form of powder or the like.

The heat treatment in a reducing atmosphere is intended to reduce the carbon content of the precursor. This reducing atmosphere may be hydrogen, ammonia, hydrazine, etc. or a mixture thereof, or a gas containing any of these components. The pressure is not limited, but atmospheric pressure is preferred from the viewpoint of simplifying the operation.

The most adequate temperature of the heat treatment depends on the time for which the treatment is carried out, but generally the temperature in a range of 400° to 1600° C. is preferable. If the temperature is lower than 400° C., there is little cleavage of the C—Si or C—N bond, and if the temperature is higher than 1600° C., silicon carbide is preferentially formed since the C—Si bond is more stable than the C—N bond at that temperature. The most adequate time for the heat treatment depends on the thickness of the shape and the heat treatment temperature, but generally more than six minutes is preferable.

After the heat treatment in a reducing atmosphere, the precursor is formed (or reformed) or pressed, if necessary, and then fired in accordance with any conventional method to obtain a nitride-base ceramic of silicon nitride or silicon oxynitride. The final ceramic product may be, of course, in the form of powder or the like.

The carbon content of a ceramic precursor for polysilazane, polysiloxazane or polycarbosilazane can be reduced, by heat treating the precursor in a reducing atmosphere such as hydrogen or ammonia or a gas containing these components, to a level lower than is possible by firing in an inert atmosphere. Nitride-base ceramic products produced from a precursor heat-treated as above have extremely low electric and thermal conductivities, and the chemical resistance and mechanical strength of the nitride-base ceramic products are not damaged by that heat treatment.

The following examples are given for illustration of the present invention and the present invention is not limited by these examples.

EXAMPLE 1

A film made of polymethylhydrosilazane was plated in a quartz container, which was inserted in a quartz firing tube. The firing tube was arranged in an infrared image furnace, produced by Shinku-rikoh K.K. While ammonia was injected at a flow rate of 0.5 l/min in the firing tube, the temperature was raised from room temperature to a predetermined temperature, listed in Table 1, at a temperature elevation rate of 3° C./min, and kept at the predetermined temperatures for about 3 hours, followed by allowing to cool to room temperature. A solid product was obtained from thermal decomposition of the polymethylhydrosilazane film, and an elemental analysis of the solid product was carried out. The results are shown in Table 1.

TABLE 1

| | | Composition (wt %) | | | |
|---|---|---|---|---|---|
| | Silicon | Nitrogen | Carbon | Hydrogen | Oxygen |
| Polymethylhydrosilazane | 46.4 | 23.0 | 23.1 | 7.6 | 0.0 |
| Firing Temperature (°C.) 400 | 48.9 | 24.4 | 20.2 | 6.5 | 0.0 |
| 500 | 49.6 | 30.0 | 14.7 | 5.7 | 0.0 |
| 600 | 50.9 | 30.9 | 13.3 | 4.9 | 0.0 |
| 700 | 54.9 | 41.3 | 1.3 | 2.5 | 0.0 |
| 800 | 55.4 | 41.6 | 0.6 | 2.3 | 0.0 |
| 1000 | 57.9 | 40.0 | 0.5 | 1.5 | 0.0 |

As seen in Table 1, the carbon content of the solid product was reduced only slightly when heat treated at a temperature lower than 400° C., but was remarkably reduced at a temperature higher than 400° C.

EXAMPLE 2

(Comparative)

The procedures described in Example 1 were repeated, but nitrogen was used instead of ammonia. Thus, by thermal decomposition of the polymethylhydrosilazane film, a black solid film-like product was obtained. The product was analyzed and the results are shown in Table 2.

TABLE 2

| Firing Temperature (°C.) | Composition (wt %) | | | | |
|---|---|---|---|---|---|
| | Silicon | Nitrogen | Carbon | Hydrogen | Oxygen |
| 600 | 54.1 | 23.0 | 17.9 | 5.7 | 0.0 |
| 700 | 55.3 | 23.2 | 17.9 | 3.6 | 0.0 |
| 800 | 59.2 | 23.2 | 15.9 | 1.3 | 0.0 |
| 1000 | 57.7 | 26.3 | 15.9 | 0.1 | 0.0 |

As seen in Table 2, a large carbon content remained in the product even if heat treated at 1000° C.

EXAMPLE 3

Powders of polymethylhydrosiloxazane were placed in a silicon nitride container, which was then inserted in a tubular furnace made of alumina. While ammonia/nitrogen mixed gas (ammonia/nitrogen volume ratio of 1:1) was injected at a flow rate of 1.0 l/min in the alumina firing tube, the temperature therein was raised from room temperature to a predetermined temperature, listed in Table 3, at a temperature elevation rate of 10° C./min and kept at the predetermined temperature for about three hours, followed by allowing to cool to room temperature. Solid powder products were obtained and were subjected to elemental analysis. The results are shown in Table 3.

TABLE 3

| | Composition (wt %) | | | | |
|---|---|---|---|---|---|
| | Silicon | Nitrogen | Carbon | Hydrogen | Oxygen |
| Polymethyl-hydro-siloxazane | 42.6 | 20.8 | 20.8 | 6.7 | 9.0 |
| Firing temperature 1380° C. | 58.2 | 28.1 | 0.3 | 0.7 | 12.2 |

EXAMPLE 4

Polyperhydrosilazane fibers containing 1 wt% polyethyleneoxide ($8.4 \times 10^{-3}$ mm in diameter × about 60 mm in length) were placed in a quartz container, which was inserted in a firing tube made of quartz. The firing tube was then placed in an infrared image furnace. Hydrogen/nitrogen mixed gas (hydrogen/nitrogen volume ratio of 1:1) was injected in the firing tube at a flow rate of 0.5 l/min, the temperature in the furnace was raised from room temperature to 1000° C. at a temperature elevation rate of 3° C./min and kept at 1000° C. for three hours. After allowing to cool to room temperature, the resultant fired fibers were analyzed for carbon content. The 1.2 wt% carbon content of the starting fibers was remarkably decreased to 0.1 wt% after firing.

EXAMPLE 5

(Comparative)

The polyperhydrosilazane fibers described in Example 4 were fired using the same procedures as in Example 4, but in a nitrogen atmosphere. The carbon content of the resultant fibers after firing was 0.65 wt%.

The properties of the silicon nitride fibers produced in Example 4 had an improved electrical resistance while retaining the mechanical strength thereof, in comparison with the product in Example 2. The results are shown in Table 4.

TABLE 4

| Property | Atmosphere | |
|---|---|---|
| | Nitrogen | Hydrogen/Nitrogen |
| Electrical Resistance [Ωcm] | 2 to 7 × $10^{10}$ | 1.2 to 9 × $10^{11}$ |
| Tensile Strength [kg/mm$^2$] | 30 to 220 | 28 to 240 |

EXAMPLE 6

10 g of tris(N-methylamino)methylsilane was placed in contact with a Raschig ring of glass heated to 520° C. to carry out a thermal polymerization for four hours, followed by removing more volatile components under a reduced pressure. Thus, 3.1 g of red brown polycarbosilazane resin was obtained. The polycarbosilazane resin was melted at 220° C. and spun in an argon atmosphere. The resultant fibers were allowed to stand in a closed glass container in which the relative humidity was adjusted to 95%, thereby infusiblizing the fibers. The fibers were inserted in a quartz container, which was placed in a quartz firing tube. The tube was then placed in an infrared image furnace. While ammonia was injected in the firing tube at a flow rate of 0.4 l/min, the temperature in the furnace was raised to 1000° C. at a temperature elevation rate of 10° C./min and kept at 1000° C. for about five hours. After allowing to cool to room temperature, the carbon content of the resultant silicon oxynitride fibers was analyzed. The carbon content was reduced from 33.2 wt% in the infusiblized fibers to 0.24 wt% in the fired fibers. The electrical resistance of the silicon oxynitride fibers was 0.6 to $5 \times 10^{10}$ Ωcm and the tensile strength 18 to 71 kg/mm$^2$. In comparison, Si—N—C(O) fibers obtained from the polycarbosilazane fibers by heat treating in the nitrogen atmosphere had an electrical resistance of $3.4 \times 10^7$ to $1.2 \times 10^9$ Ωcm and a tensile strength of 20 to 60 kg/mm$^2$. Therefore, it is seen that the silicon oxynitride fibers produced in the procedure of Example 6 had a better electrical resistance without any loss of tensile strength.

EXAMPLE 7

In place of the ammonia at the flow rate of 0.5 l/min used in Example 1, hydrogen was used at a flow rate of 0.75 l/min. The other procedures were the same as in Example 1.

The results of the elemetal analysis of the solid thermal decomposition product are shown in Table 5.

TABLE 5

| Firing Temperature (°C.) | Composition (wt %) | | | | |
|---|---|---|---|---|---|
| | Silicon | Nitrogen | Carbon | Hydrogen | Oxygen |
| 900 | 57.6 | 32.2 | 8.4 | 1.4 | 0.0 |

We claim:

1. A method for producing a nitride-base ceramic, consisting essentially of the steps of: heat treating a ceramic precursor consisting essentialy of one selected from the group consisting of polysilazane, polysiloxazane, polycarbosilazane and a mixture thereof, in an atmosphere consisting esentially of at least one of hydrogen, ammonia and hydrazine at a temperature within a range of 400° to 1000° C. to reduce the carbon content of the ceramic precursor; and then firing the ceramic precursor to produce one of silicon nitride and silicon oxynitride with a low carbon content.

2. The method according to claim 1, wherein said heat treatment is carried out at a temperature within a range of 400° C. to 800° C.

3. The method according to claim 1, wherein the atmosphere for the heat treatment consists essentially of hydrogen.

4. The method according to claim 1, wherein the atmosphere for the heat treatment consists essentially of ammonia.

* * * * *